(12) United States Patent
Darwinkel et al.

(10) Patent No.: US 9,394,191 B2
(45) Date of Patent: Jul. 19, 2016

(54) DEVICE FOR SUBJECTING A LIQUID TO A PURIFYING PROCESS

(75) Inventors: Gert-Jan Darwinkel, Drachten (NL); Narendra Nilkanth Pawar, Pune (IN)

(73) Assignee: KONINKLIJKE PHILIP N.V., Eindhoven (NL)

( * ) Notice: Subject to any disclaimer, the term of this patent is extended or adjusted under 35 U.S.C. 154(b) by 688 days.

(21) Appl. No.: 13/501,334

(22) PCT Filed: Oct. 25, 2010

(86) PCT No.: PCT/IB2010/054818
§ 371 (c)(1),
(2), (4) Date: Apr. 11, 2012

(87) PCT Pub. No.: WO2011/055264
PCT Pub. Date: May 12, 2011

(65) Prior Publication Data
US 2012/0205299 A1    Aug. 16, 2012

(30) Foreign Application Priority Data
Nov. 3, 2009  (EP) .................................... 09174831

(51) Int. Cl.
*C02F 1/00*    (2006.01)
*C02F 1/32*    (2006.01)
(Continued)

(52) U.S. Cl.
CPC ............... *C02F 9/005* (2013.01); *B01D 61/025* (2013.01); *B01D 2311/2619* (2013.01); *C02F 1/32* (2013.01); *C02F 1/441* (2013.01); *C02F 2201/326* (2013.01); *C02F 2201/3223* (2013.01); *C02F 2209/005* (2013.01); *C02F 2209/40* (2013.01); *C02F 2209/42* (2013.01)

(58) Field of Classification Search
CPC ................. C02F 1/00; C02F 1/32; C02F 1/44
USPC ............. 210/97, 257.1, 256, 142, 257.2, 261, 210/315, 342
See application file for complete search history.

(56) References Cited

U.S. PATENT DOCUMENTS 4,518,503 A * 5/1985 Fermaglich ................... 210/662
5,397,468 A   3/1995 Chomka et al.
(Continued)

FOREIGN PATENT DOCUMENTS

JP        04317789 A      9/1992
JP     2007307542 A    11/2007
(Continued)

*Primary Examiner* — Robert Clemente
*Assistant Examiner* — Akash Varma

(57) ABSTRACT

A device (1) for subjecting a liquid to a purifying process comprises an assembly of a first container (10) and a second container (20) for receiving and containing a liquid, wherein means (11) for performing a purifying action on the liquid are arranged in the first container (10), wherein the second container (20) is arranged for receiving an overflow from the first container (10), and wherein a liquid passage (15) is present between the first container (10) and the second container (20). Furthermore, the device (1) comprises means (16) which are associated with the liquid passage (15) between the first container (10) and the second container (20), and which are adapted to assume various states, including a state for blocking the liquid passage (15), and a state for deblocking the liquid passage (15), wherein the device (1) may also be equipped with means (17) for controlling the blocking/deblocking means (16).

14 Claims, 6 Drawing Sheets

(51) Int. Cl.
*C02F 1/44* (2006.01)
*C02F 9/00* (2006.01)
*B01D 61/02* (2006.01)

(56) References Cited

U.S. PATENT DOCUMENTS 6,129,841 A * 10/2000 Dann .......................... 210/255
6,159,363 A    12/2000 Collins et al.
6,419,821 B1 * 7/2002 Gadgil et al. ................... 210/86
7,226,536 B2 * 6/2007 Adams ......................... 210/202
2002/0003327 A1  1/2002 Enoki et al.
2008/0302737 A1 12/2008 Denkewicz, Jr. et al.

FOREIGN PATENT DOCUMENTS

| NL | 1023450 C2 | 11/2004 |
| WO | 0162672 A1 | 8/2001 |
| WO | 2006065723 A2 | 6/2006 |
| WO | 2008095230 A1 | 8/2008 |

* cited by examiner

DEVICE FOR SUBJECTING A LIQUID TO A PURIFYING PROCESS

FIELD OF THE INVENTION

The present invention relates to a device for subjecting a liquid to a purifying process, and to an assembly for purifying a liquid, comprising a device as mentioned as one of a number of modules for performing purifying actions on the liquid.

BACKGROUND OF THE INVENTION

It is a well-known fact that in many parts of the world, safe, clean water can only be obtained by using techniques which are aimed at purifying water. One of the known techniques is exposing water to ultraviolet light, which has a disinfecting effect on the water. In general, household devices for subjecting water to a treatment with ultraviolet light are known, wherein these devices may be stand-alone devices or part of a larger assembly in which more water purifying treatments are carried out during operation. An example of a larger assembly is an assembly comprising various modules, comprising a module having a reverse osmosis filter besides a module having a source for emitting ultraviolet light.

When ultraviolet light is used for treating water, it is important that all portions of a quantity of the water are exposed to the light for a certain period of time. If the time is too short, too many active microbes remain in the water, and the desired result of the treatment is not obtained. One way of guaranteeing an effective treatment of the water is arranging the source for emitting ultraviolet light in a relatively small container, and letting a quantity of water stay in that container for an appropriate length of time.

However, there is a disadvantage that is related to using a relatively small container, namely the fact that only small quantities of water can be treated at one time. A larger container would require a more powerful source for emitting ultraviolet light and/or more sources for emitting ultraviolet light, which is not an option in applications in countries where not only safe water is scarce, but electric current is scarce as well.

SUMMARY OF THE INVENTION

It is an object of the invention to provide a device for subjecting a liquid to a purifying process, which is capable of effectively treating larger quantities of liquid than a known device using the same purifying technique, without necessarily requiring more electric power for its operation. The object is achieved by means of a device which comprises the following components:

an assembly of a first container and a second container for receiving and containing a liquid, wherein means for performing a purifying action on the liquid are arranged in the first container, wherein the second container is arranged for receiving an overflow from the first container, and wherein a liquid passage is present between the first container and the second container; and means which are associated with the liquid passage between the first container and the second container, and which are adapted to assume various states, including a state for blocking the liquid passage, and a state for deblocking the liquid passage.

According to the present invention, two containers are used, wherein means for performing a purifying action on a liquid are arranged in a first container, and wherein a second container is arranged for receiving an overflow from the first container. The volume of the first container may be comparable to the volume of a container from a similar liquid purifying device known from the art. However, the volume of the combination of the first container and the second container can be larger than the known volume, wherein it is still possible to have an effective treatment of the liquid without a need for more power, as will be explained in the following.

In the device according to the present invention, there is a liquid passage between the two containers which are part of the device, and there are means for blocking or deblocking the liquid passage. Important advantages of the present invention are found when the way in which the device according to the present invention is operated is considered, wherein the state of the liquid passage is varied. Hence, in order to clarify the present invention, the operation of the device will be explained in the following.

When the operation of the device is started, the first container is filled with a quantity of the liquid, while the blocking/deblocking means are kept in a blocking position, and the means which are suitable for performing a purifying action are activated. Hence, in the process, the liquid inside the first container is purified, wherein the extent to which the purification has taken place can be sufficient, namely when a suitable volume is chosen in respect of the first container.

Furthermore, the second container is filled with the liquid. In this respect, it is noted that in view of the fact that the second container is arranged for receiving an overflow from the first container, it possible for a filling process of the second container to start automatically when the level of the liquid inside the first container reaches a maximum. In the process of overflow of liquid from the first container to the second container, the liquid is received by the second container, which is at least partly arranged at a lower level than the first container in order to be actually capable of performing this liquid receiving function.

During the filling process, the level of the liquid inside the second container rises and rises. At a certain point during the process of filling the second container, or at the end of the filling process, the blocking/deblocking means are put to a deblocking position, so that the liquid passage is opened.

Eventually, when the first container and the second container are filled to a sufficient extent, the supply of liquid is stopped. For example, the device according to the present invention may be equipped with a suitable automatic liquid flow stop for realizing the stop at the right time. The blocking/deblocking means are still kept in the deblocking position, so that it is achieved that the liquid passage between the first container and the second container is still open. Hence, it is possible to treat the liquid in the first container on the one hand, and to have a larger volume than just the volume of the first container on the other hand, wherein it is possible to have only purified liquid in the device on the basis of the liquid communication between the first container and the second container.

In a practical embodiment of the device according to the present invention, the first container is arranged in the second container. Furthermore, it may be so that the blocking/deblocking means comprise a closeable/openable valve, wherein such valve may be arranged in the bottom of the first container.

The device according to the present invention may comprise means which are adapted to control the state of the blocking/deblocking means. Preferably, the means are adapted to control the blocking/deblocking means in such a way that when the device is operated, the first container can be filled first, wherein the liquid passage is kept closed, and liquid communication between the first container and the second container is allowed at a later stage, when the second container is filled to a sufficient extent. For example, when the filling process of the containers takes place by using a pump, the state of the blocking/deblocking means may be controlled on the basis of the state of the pump, wherein the blocking/deblocking means are kept in a blocking position when the pump is operated, and wherein the blocking/deblocking means are put to a deblocking position when the pump is shut off.

In general, the device may comprise means for putting the blocking/deblocking means to a deblocking position in a situation in which liquid is present inside both the first container and the second container, in order to allow for liquid communication between the first container and the second container. In a preferred embodiment of the device according to the present invention, controlling means are provided which are operable depending on a level of the liquid inside the second container, and which are adapted to put the blocking/deblocking means to a deblocking position when liquid is present inside the second container and the level of the liquid inside the second container is above a predetermined minimum, and to put the blocking/deblocking means to a blocking position when the level of the liquid inside the second container is below the predetermined minimum.

Preferably, the means for controlling the blocking/deblocking means are adapted to work automatically, wherein there is no need for a supply of electric power for letting the controlling means function in an appropriate manner. According to a possibility existing within the scope of the present invention, the controlling means comprise a member which is capable of catching and retaining air. In that case, a default position of the member is associated with a blocking position of the blocking/deblocking means. When the liquid level in the second container rises, the liquid eventually reaches the member of the controlling means. At that point, air is trapped between the liquid and the member, and when the liquid level rises further, the member is pushed to a new position.

On the basis of the fact that the member of the controlling means rises with the liquid level in the second container, it is possible to relate the position of the blocking/deblocking means to the liquid level in such a way that when the member is in the default position, the blocking/deblocking means are in the blocking position, and when the member is in another position, namely a position associated with a liquid level in the second container that is higher than the default position of the member, the blocking/deblocking means are in the deblocking position.

Advantageously, the member of the controlling means is physically coupled to a member of the blocking/deblocking means, so that there is a reliable and direct link between the members as mentioned. Once again, it is noted that there is no need for electric power as far as the functioning of the controlling means and the positioning of the blocking/deblocking means is concerned.

The member of the controlling means may be arranged in the vicinity of the bottom of the first container. In a practical embodiment, the member is connected to the bottom of the first container, wherein the connection is such that it is possible for the member to move with respect to the bottom of the container along a certain length, namely the length needed for changing the position of the blocking/deblocking means.

In order to have a controlled overflow from the first container to the second container, it is possible to have at least one opening in the first container, wherein the opening is positioned at a distance from the bottom of the container. In that case, overflow takes place as soon as liquid inside the first container reaches the opening.

In an advantageous embodiment, the device according to the present invention comprises means which are adapted to operate the means for performing a purifying action on the liquid in alternating cycles. By realizing an operation of the means for performing a purifying action on the liquid as mentioned, it is achieved that a flow of liquid can be started in the case that the liquid passage is opened. When the means for performing a purifying action on the liquid are capable of generating heat during their operation, a flow of liquid can be started on the basis of the fact that hot liquid flows in an upward direction. In the process, the first container where the means are arranged acts more or less like a chimney, wherein liquid is drawn in from the second container. When a flow of the liquid from the second container to the first container is obtained, and the liquid flows from the first container back to the second container, circulation of the liquid takes place, which has as an advantageous effect that all of the liquid regularly experiences the influence of the means for performing a purifying action on the liquid. Hence, a refreshing flow takes place, wherein a larger volume of liquid than just the volume of the first container is continually treated.

In order to have an optimal refreshing effect and an optimal flow of liquid through the device according to the present invention in the situation that the liquid passage is opened, it is possible for the housing of the first container to be provided with heat insulation. In this way, a difference between temperatures prevailing in the two containers is kept as large as possible, so that the driving force causing the flow can be as large as possible.

The means for performing a purifying action on the liquid can be any suitable means, including means which are adapted to emit ultraviolet light.

The present invention further relates to an assembly for purifying a liquid, comprising the device according to the present invention as one of a number of modules for performing purifying actions on the liquid. For example, another module of the assembly may be module comprising a filter for removing particles from the liquid. The assembly may be an assembly for purifying a liquid on the basis of the reverse osmosis principle, wherein one of the modules is a module in which a reverse osmosis filter is arranged. As reverse osmosis is a well-known liquid purifying technique, and the present invention does not apply to this technique in particular, an explanation of this technique is omitted.

The above-described and other aspects of the present invention will be apparent from and elucidated with reference to the following detailed description of the design and the operation of an advantageous embodiment of the device according to the present invention.

BRIEF DESCRIPTION OF THE DRAWINGS

The present invention will now be explained in greater detail with reference to the figures, in which equal or similar parts are indicated by the same reference signs, and in which.

DETAILED DESCRIPTION OF EMBODIMENTS

Figure 1:
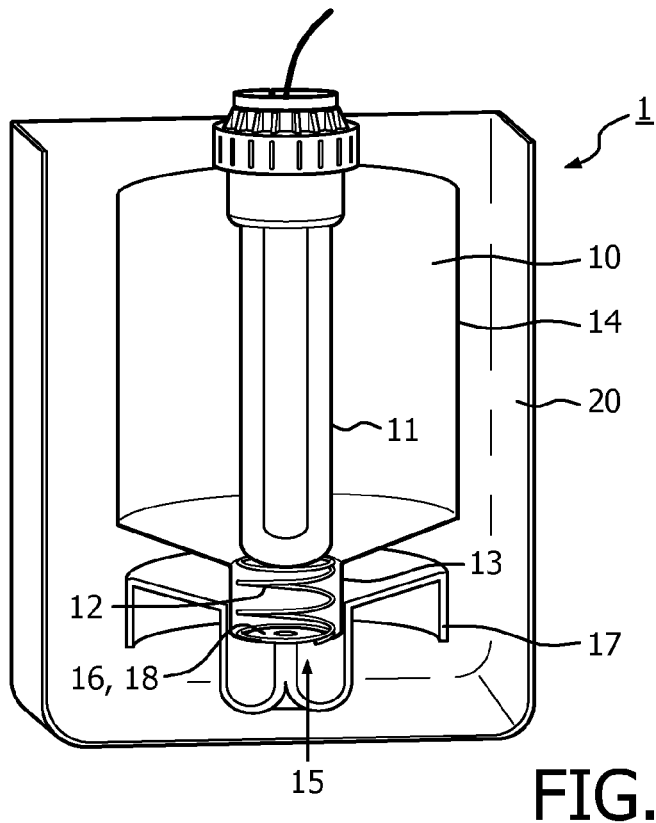
FIG. 1 shows an advantageous embodiment of the device according to the present invention, wherein a part of the device is taken away in order to provide a view of the inside of the device, and wherein a valve of the device is shown in a blocking position.

FIG. 1 shows a device 1 for purifying a liquid according to the present invention, wherein the interior of the device 1 can be seen on the basis of the fact that a part of the device 1 is taken away.

In the shown embodiment, the liquid purifying device 1 comprises a relatively small first container 10 and a relatively large second container 20, wherein the first container 10 is arranged inside the second container 20. Inside the first container 10, an elongated lamp 11 for emitting ultraviolet light is arranged, extending along a substantial part of the height of the first container 10, at a central position. The lamp 11 is supported by a spring 12 which is arranged in a bottom part 13 of the first container 10. Preferably, a housing 14 of the first container 10 is adapted to protect the surroundings of the first container 10 against the ultraviolet light. To that end, the housing 14 may be made of metal, for example.

The bottom part 13 has an opening 15, which will hereinafter be referred to as liquid passage 15. On the basis of the fact that the first container 10 is arranged inside the second container 20, the liquid passage 15 is suitable for allowing communication between liquid which is present inside the first container 10 and liquid which is present inside the second container 20. However, in various stages of the operation of the liquid purifying device 1, it is advantageous if the liquid passage 15 is blocked. Therefore, in the shown example, a valve 16 is provided, which is capable of blocking or deblocking the liquid passage 15, depending on the position of the valve 16 with respect to the bottom part 13 of the first container 10.

For the purpose of controlling the position of the valve 16 with respect to the bottom part 13, a float 17 is used, wherein a member 18 of the valve 16 is physically coupled to the float 17. In the shown example, the float 17 is more or less shaped like a disk having a central hole, wherein the float 17 is positioned such that the bottom part 13 of the first container 10 is snugly received in the central hole of the float 17, and wherein the float 17 has a slidable arrangement with respect to the bottom part 13.

A particular feature of the shown example of the float 17 is the fact that the float 17 has a hollow appearance at the side facing downward, wherein there are standing rims at both an outer circumference and an inner circumference of the float 17.

Figure 2:
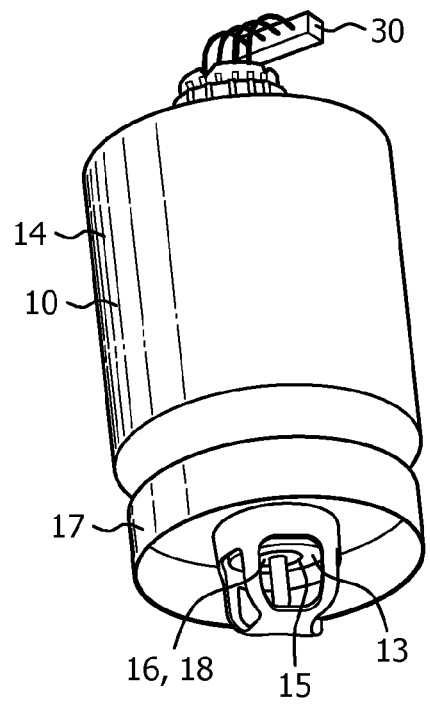
FIG. 2 shows a perspective view of several components of the device shown in FIG. 1, including a first container and the valve, wherein the valve is shown in the blocking position.
Figure 3:
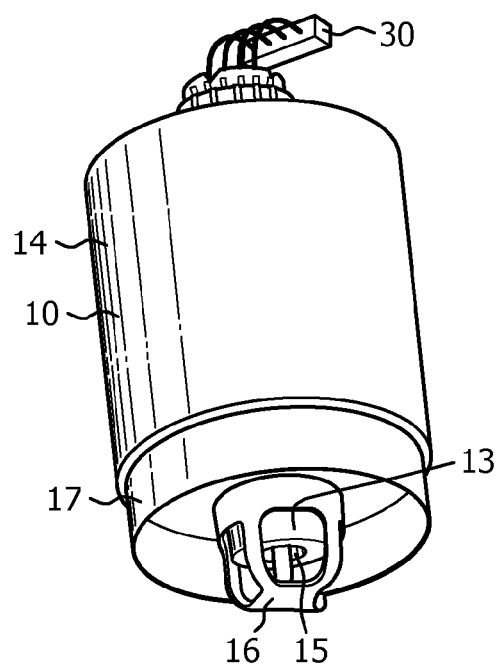
FIG. 3 shows another perspective view of the components shown in FIG. 2, wherein the valve is shown in a deblocking position.
Figure 4:
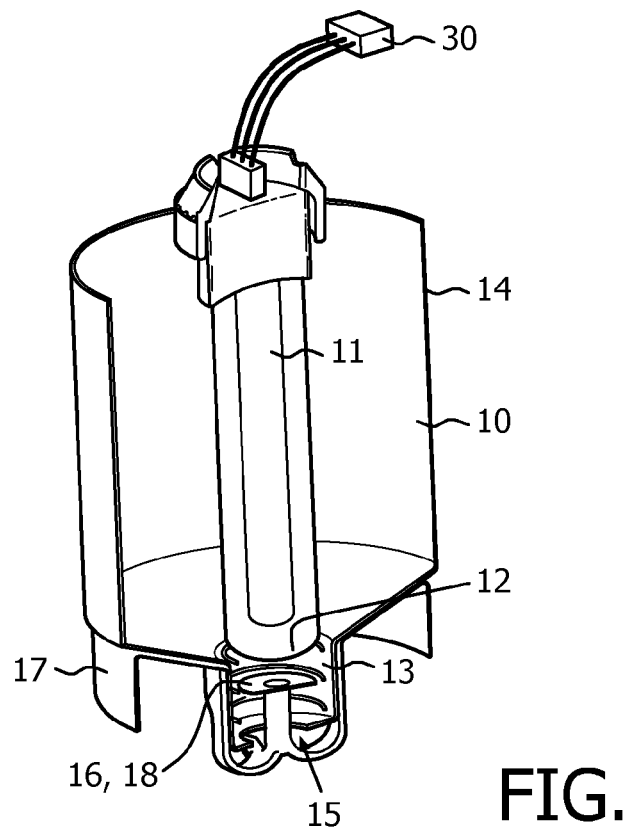
FIG. 4 shows another view of the components shown in FIG. 2, wherein a part of the components is taken away in order to provide a view of the inside of the first container, wherein the valve of the device is shown in the deblocking position.

In a default position of the float 17, as shown in FIG. 1, the valve 16 is at a position for blocking the liquid passage 15. FIG. 2 shows a perspective view of the first container 10 and the combination of the valve 16 and the float 17, wherein the blocking position of the valve 16 is illustrated once more. In another position of the float 17, namely a position at a higher level as shown in FIGS. 3 and 4, the valve 16 is at a position for deblocking the liquid passage 15, wherein a movably arranged closing member 18 of the valve 16 is at a position above the liquid passage 15, as can be seen in FIG. 4.

Figure 5:
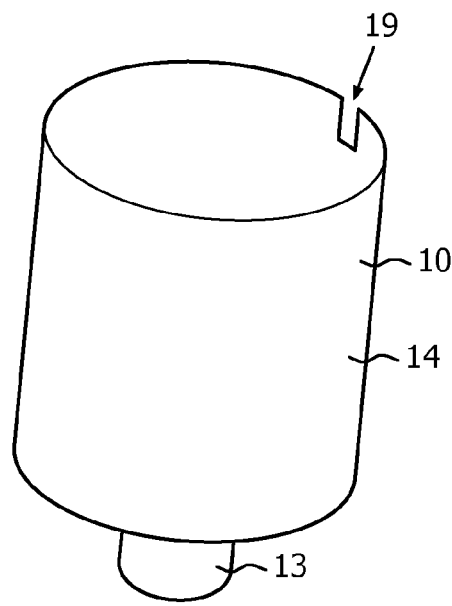
FIG. 5 shows a perspective view of the first container of the device shown in FIG. 1.

When the second container 20 is filled with a liquid during operation of the liquid purifying device 1, this is done indirectly, wherein overflow from the first container 10 is one possibility. For the purpose of having a defined overflow, the first container 10 is equipped with an opening 19 which is positioned at a certain distance from the bottom part 13 of the first container 10. As soon as the liquid level inside the first container 10 reaches the opening 19, overflow takes place, wherein the liquid is received by the second container 20. FIG. 5 shows the first container 10 with the overflow opening 19, which is realized as a notch in the housing 14 of the container 10 from a top side in this case.

The operation of the liquid purifying device 1 will be explained in the following. An important function of the device 1 is treating a liquid with ultraviolet light, such as to disinfect the liquid. Another important function is storing a certain quantity of the liquid, wherein all of the liquid should be disinfected.

FIGS. 6-12 illustrate various steps in the operation of the device 1. It is noted that in these figures, a supply and a flow of liquid are indicated by means of arrows.

Figure 6:
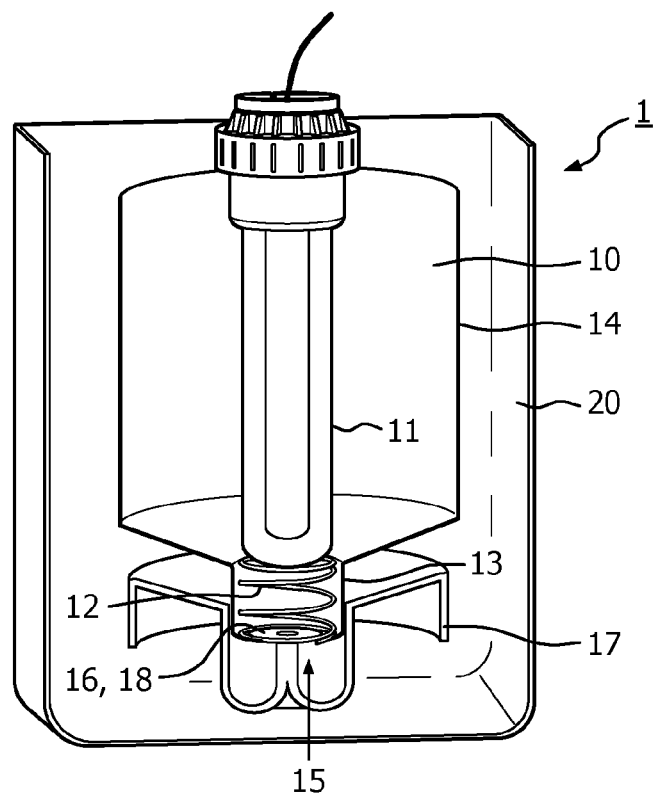
FIGS. 6-12 illustrate successive stages of operation of the device shown in FIG. 1.

FIG. 6 provides an impression of the device 1 prior to use. In this initial situation, there is no liquid present in the device 1, and the combination of the valve 16 and the float 17 is in the default position, i.e. the position associated with blockage of the liquid passage 15.

Figure 7:
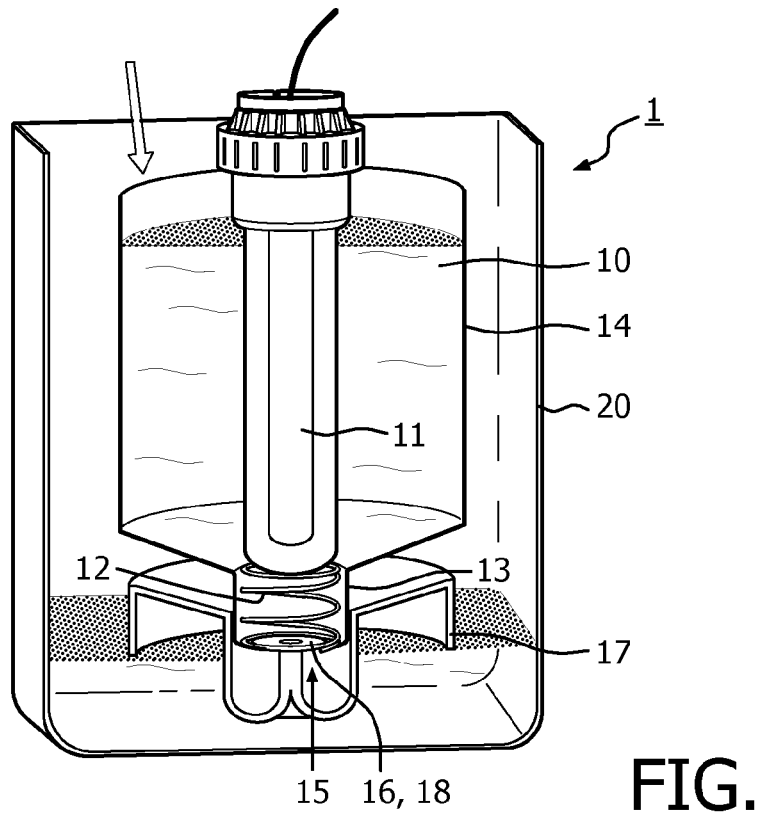

Starting from the initial situation, a liquid like water is supplied to the first container 10. In the shown example, the supply of the liquid takes place at the top side of the first container 10. In the process, the lamp 11 for emitting ultraviolet light is activated, so that the liquid is subjected to a purifying treatment. FIG. 7 illustrates a situation in which the liquid level inside the first container 10 has just reached the level of the opening 19 for allowing overflow of the liquid from the first container 10 to the second container 20.

Figure 8:
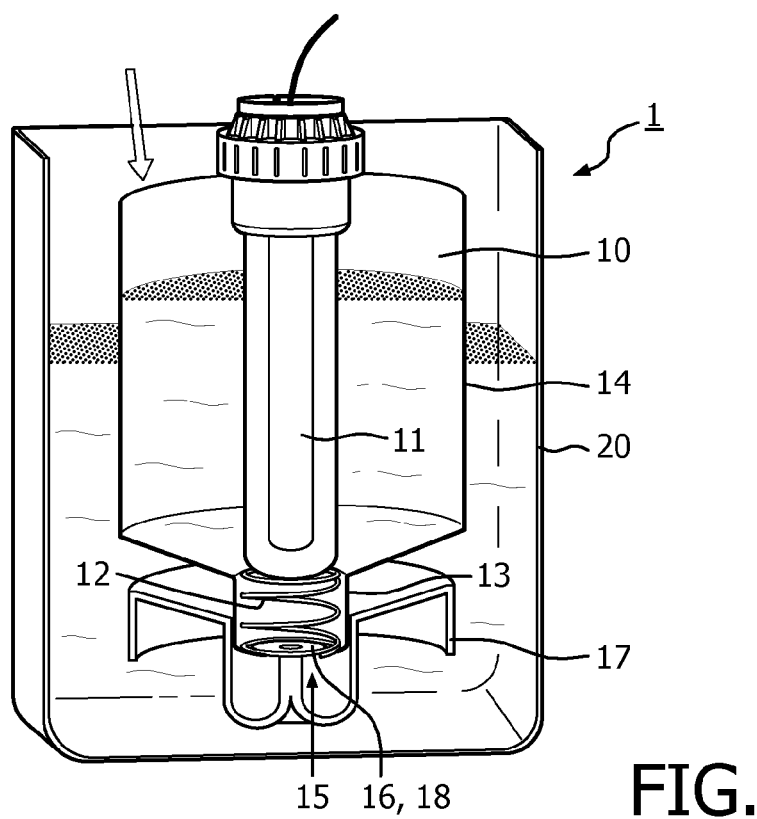
Figure 9:
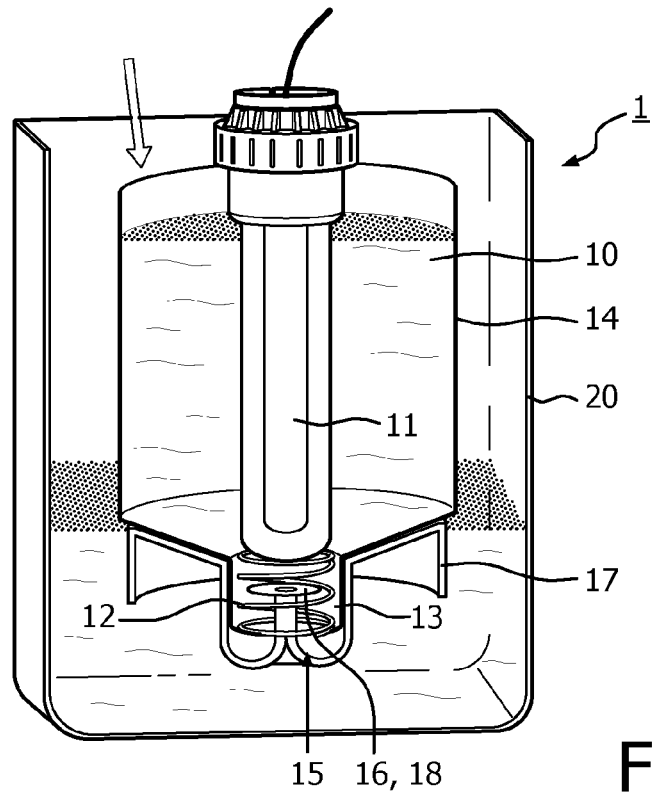

As the overflow continues, the liquid level inside the second container 20 eventually reaches the float 17. FIG. 8 illustrates this situation. Due to the hollow appearance of the float 17, it is achieved that air is caught in the float 17, as a result of which the float 17 is pushed in an upward direction as long as the liquid level inside the second container 20 rises. Hence, the float 17 is made to leave the default position, and to slide along the bottom part 13 of the first container 10 until the movement of the float 17 is stopped as a result of abutment against the first container 10. FIG. 9 illustrates the new position of the float 17, wherein the valve 16 is in a position for deblocking the liquid passage 15.

When the liquid passage 15 is opened, the liquid level in the first container 10 will drop, and the liquid level in the second container 20 will rise, so that a situation is obtained in which both liquid levels are equal. In the process, the supply of liquid to the first container 10 continues, as it is intended to have both containers 10, 20 filled.

Figure 10:
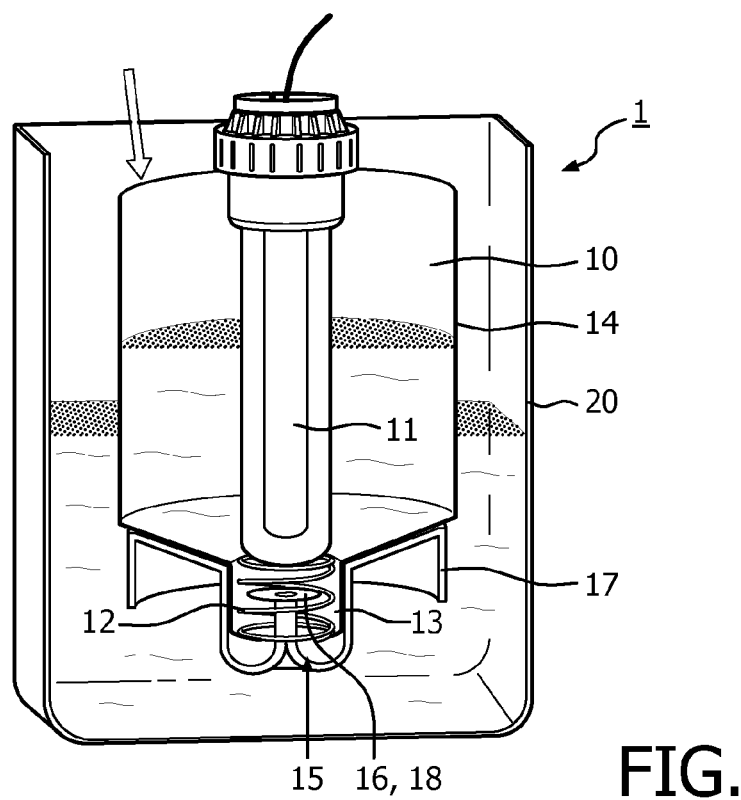
Figure 11:
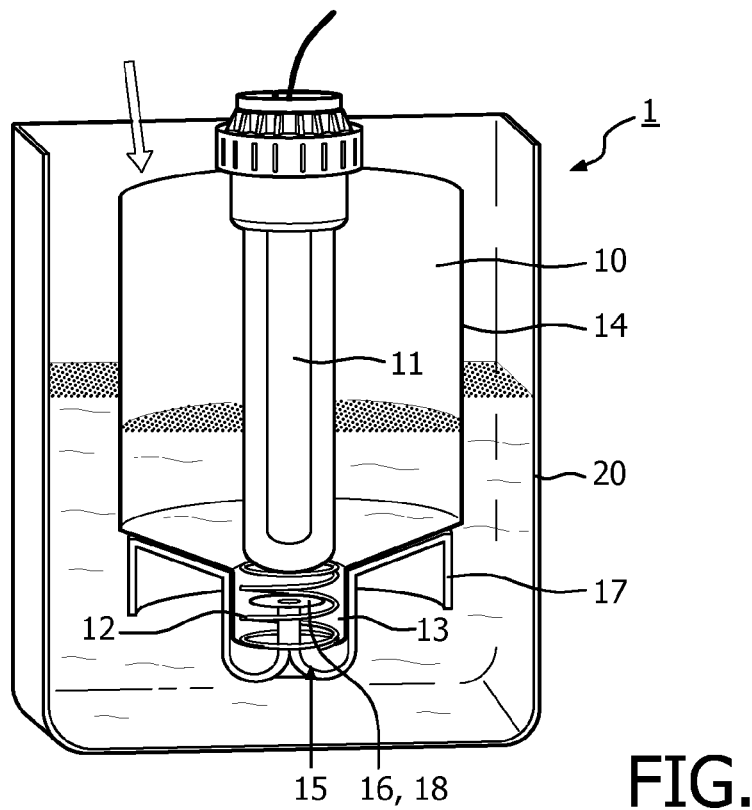

FIG. 10 illustrates the drop of the liquid level in the first container 10 and the rise of the liquid level in the second container 20, while FIG. 11 illustrates the situation in which the liquid levels are equal. From this stage on, the liquid levels will rise in an equal manner as long as the supply of liquid to the first container 10 is continued, wherein the second container 20 is provided with liquid from the first container 10, through the liquid passage 15.

Figure 12:
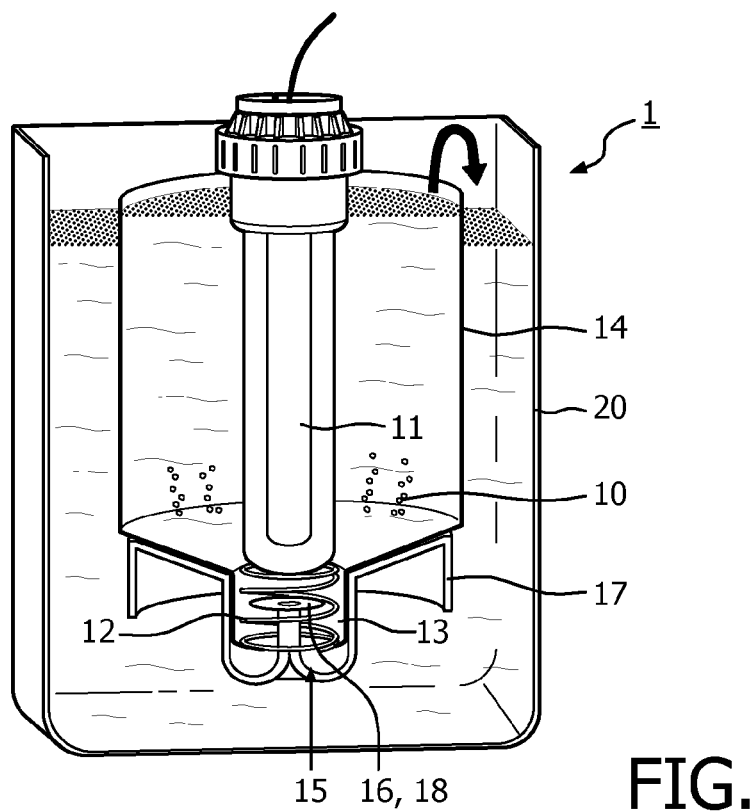

Eventually, the first container 10 and the second container 20 are completely filled with the liquid. FIG. 12 illustrates this situation in which the liquid levels in both containers 10, 20 are at the level of the overflow opening 19 of the first container 10. For sake of completeness, it is noted that the supply of the liquid may be stopped by using suitable means which are adapted to do so when a certain minimum liquid level is reached, and which may be incorporated in the liquid purifying device 1.

In the situation in which the liquid purifying device 1 is filled to the maximum, there is a risk that not all of the liquid is purified to a desirable extent. Especially the liquid that is present outside of the first container 10, i.e. that is present inside the second container 20, is not under the influence of the lamp 11 for emitting ultraviolet light, as a result of which the extent to which the liquid is disinfected may be unacceptable. In order to avoid this situation, special measures are proposed, which involve a specific way of operating the lamp 11. In particular, the lamp 11 is controlled such as to have alternating ultraviolet heating cycles, as a result of which a flow of liquid is obtained in the device 1 according to the present invention. The reason is that under the influence of the lamp 11, relatively hot liquid is obtained at a top side of the device 1, whereas relatively cold liquid is present at a bottom side of the device 1. Under the influence of the temperature difference, the liquid starts flowing from the second container 20 to the first container 10 through the liquid passage 15, while liquid flows back to the second container 20 through the overflow opening 19. In other words, the liquid starts to circulate through the device 1, which is very advantageous in view of the fact that in this way, it is achieved that all of the liquid experiences the influence of the lamp 11 from time to time. In fact, a chimney effect is obtained, wherein the first container 10 may be regarded as the chimney for letting out liquid at the top side.

It is noted that means for controlling the operation of the lamp 11 are diagrammatically shown in FIGS. 2-4 and indicated by reference numeral 30.

In order to enhance the heating effect of the lamp 11 and to have a temperature difference in the device 1 that is as large as possible, it is possible for the housing 14 of the first container 10 to be provided with heat insulating material. In this way, heat transfer to the bottom side of the device 1 is avoided.

When the liquid purifying device 1 is emptied, both the first container 10 and the second container 20 are emptied, until the liquid level inside the second container 20 drops below the minimum that is associated with the default position of the float 17. When that happens, the float 17 is back at the default position again, as a result of which the valve 16 is back at the blocking position again. At that stage, the empty first container 10 is closed, and the operation of the liquid purifying device 1 as described in the foregoing can be repeated once the second container 20 is emptied as well.

By keeping the first container 10 closed in a first instance, it is achieved that the liquid is under the influence of the lamp 11 for emitting ultraviolet light for a sufficiently long time. Hence, the extent to which the liquid inside the device 1 is disinfected may be sufficient. Due to the design with the two containers 10, 20 as described in the foregoing, it is possible to have a larger volume than just the volume of the first container 10. It is possible to realize circulation of the liquid through the device 1, so that a refreshing action is obtained, as a result of which the risk of a decrease in a disinfected state of the liquid is eliminated. As the opening and closing of a liquid passage 15 between the two containers 10, 20 is performed on the basis of the action of a float 17, there is no need for electric control in the device 1, which makes the device 1 suitable to be used under various types of circumstances, including circumstances in which a supply of electric current is not reliable and/or scarce/expensive.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

It is noted that the device 1 according to the present invention may be used for purifying various types of liquid, wherein water is a practical example of the liquid.

The present invention can be summarized as follows. A device 1 for subjecting a liquid to a purifying process comprises an assembly of a first container 10 and a second container 20 for receiving and containing a liquid, wherein means 11 for performing a purifying action on the liquid are arranged in the first container 10, wherein the second container 20 is arranged for receiving an overflow from the first container 10, and wherein a liquid passage 15 is present between the first container 10 and the second container 20. In a practical embodiment, the first container 10 is arranged inside the second container 20.

Furthermore, the device 1 comprises means 16 which are associated with the liquid passage 15 between the first container 10 and the second container 20, and which are adapted to assume various states, including a state for blocking the liquid passage 15, and a state for deblocking the liquid passage 15, wherein the device 1 may also be equipped with means 17 for controlling the blocking/deblocking means 16. Such controlling means 17 may be operable depending on a level of the liquid inside the second container 20, for example, and may be adapted to put the blocking/deblocking means 16 to a deblocking position when liquid is present inside the second container 20 and the level of the liquid inside the second container 20 is above a predetermined minimum, and to put the blocking/deblocking means 16 to a blocking position when the level of the liquid inside the second container 20 is below the predetermined minimum.

With the design of the device 1 as described, it is possible to subject a certain quantity of liquid to a purifying action first, and then fill the device 1 with more liquid. Due to the arrangement of the two containers 10, 20 and the presence of a liquid passage 15 between the containers 10, 20, it is possible to have a circulation of liquid in the device 1, wherein the liquid is refreshed and all of the liquid remains disinfected to an acceptable extent. Blocking and deblocking of the liquid passage 15 can take place with rising and dropping of the liquid level inside the second container 20, wherein it is possible to have an automatic, reliable control of the state of the liquid passage 15.

In the embodiment of the device 1 in which the controlling means 17 which are operable depending on a level of the liquid inside the second container 20 are present, the predetermined minimum for making a distinction between the blocked state and the deblocked state of the liquid passage 15 is defined by a default position of a member of the means 17 for controlling the blocking/deblocking means 16. In the shown example, the default position is a lowest position of the member of the controlling means 17, wherein the member of the controlling means 17 is put to another position under the influence of a rising liquid level in the second container 20, until a top position is reached, in which the member of the controlling means 17 abuts against the first container 10. Preferably, the member of the controlling means 17 is adapted to catch and retain air, so that the movement of the member of the controlling means 17 away from the default position involves floating of the member of the controlling means 17 on an air bubble that is pushed in an upward direction by the liquid.

The invention claimed is:

1. A device for subjecting a liquid to a purifying process, said device comprising:
   a first container for receiving the liquid and containing a liquid purifier for heating and purifying the liquid received;
   a second container arranged for receiving an overflow of the liquid from the first container when the liquid in the first container reaches an overflow level;
   a liquid passage arranged for bi-directional flow of the liquid between the first container and the second container, said liquid passage being adapted to controllably assume a blocked state for preventing flow of the liquid through the passage and an unblocked state for allowing flow of the liquid through the passage; and
   a flotation member arranged for controlling blocking and unblocking of the liquid passage to effect filling of both the first container and second container with purified liquid;
   said heating effecting circulation of the liquid when the passage is unblocked such that the liquid flows upward in the first container and overflows into the second container while drawing liquid from the second container into the first container for purification.

2. The device according to claim 1 where the first container is disposed in the second container.

3. The device according to claim 1 where the blocked and unblocked states are effected by a valve member arranged in a bottom portion of the first container and actuated by the flotation member.

4. The device according to claim 1 where the flotation member is positioned in the device at a location for detecting a situation in which liquid is present inside both the first container and the second container in order to allow for liquid communication between the first container and the second container.

5. The device according to claim 1 where the flotation member is adapted to effect unblocking of the liquid passage when liquid inside the second container is above a predetermined minimum level, and to effect blocking of the liquid passage when liquid inside the second container is below the predetermined minimum level.

6. The device according to claim 3 where the valve member is physically coupled to the flotation member.

7. The device according to claim 1 where the flotation member is arranged in a bottom portion of the first container.

8. The device according to claim 5 where the predetermined minimum of the level of the liquid inside the second container is related to a default position of the flotation member.

9. The device according to claim 8, wherein the default position of the flotation member is a lowest position of the flotation member in a normal, operative orientation of the device.

10. The device according to claim 1 where the liquid purifier comprises an ultraviolet lamp that is adapted to operate in alternating ultraviolet heating cycles.

11. The device according to claim 1 where the first container is provided with heat insulation.

12. The device according to claim 1 where the liquid purifier comprises a device for emitting ultraviolet light.

13. An assembly for purifying a liquid, said assembly comprising a plurality of modules for performing purifying actions on the liquid including a module comprising:
   a first container for receiving the liquid and containing a liquid purifier for heating and purifying the liquid received;
   a second container arranged for receiving an overflow of the liquid from the first container when the liquid in the first container reaches an overflow level;
   a liquid passage arranged for bi-directional flow of the liquid between the first container and the second container, said liquid passage being adapted to controllably assume a blocked state for preventing flow of the liquid through the passage and an unblocked state for allowing flow of the liquid through the passage; and
   a flotation member arranged for controlling blocking and unblocking of the liquid passage to effect filling of both the first container and second container with purified liquid;
   said heating effecting circulation of the liquid when the passage is unblocked such that the liquid flows upward in the first container and overflows into the second container while drawing liquid from the second container into the first container for purification.

14. An assembly for purifying a liquid, said assembly comprising a first module including reverse osmosis filter and a second module comprising:
   a first container for receiving the liquid and containing a liquid purifier for heating and purifying the liquid received;
   a second container arranged for receiving an overflow of the liquid from the first container when the liquid in the first container reaches an overflow level;
   a liquid passage arranged for bi-directional flow of the liquid between the first container and the second container, said liquid passage being adapted to controllably assume a blocked state for preventing flow of the liquid through the passage and an unblocked state for allowing flow of the liquid through the passage; and
   a flotation member arranged for controlling blocking and unblocking of the liquid passage to effect filling of both the first container and second container with purified liquid;
   said heating effecting circulation of the liquid when the passage is unblocked such that the liquid flows upward in the first container and overflows into the second container while drawing liquid from the second container into the first container for purification.

* * * * *